(12) United States Patent
Pawlik (10) Patent No.: US 11,784,495 B2
(45) Date of Patent: *Oct. 10, 2023

(54) ADVANCED SYSTEMS AND METHODS FOR GENERATING AND CONSERVING POWER

(71) Applicant: Christopher Pawlik, Hawthorne, CA (US)

(72) Inventor: Christopher Pawlik, Hawthorne, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/855,328

(22) Filed: Jun. 30, 2022

(65) Prior Publication Data
US 2022/0337066 A1    Oct. 20, 2022

Related U.S. Application Data

(63) Continuation of application No. 16/030,762, filed on Jul. 9, 2018, now Pat. No. 11,404,880, which is a
(Continued)

(51) Int. Cl.
*H02J 3/38* (2006.01)
*H05B 45/30* (2020.01)
(Continued)

(52) U.S. Cl.
CPC ............. *H02J 3/381* (2013.01); *H02J 3/388* (2020.01); *H02J 3/46* (2013.01); *H05B 41/36* (2013.01); *H05B 45/30* (2020.01); *H02J 7/35* (2013.01); *H02J 2300/24* (2020.01); *H02J 2300/28* (2020.01); *H02J 2300/30* (2020.01)

(58) Field of Classification Search
CPC .......... H02J 3/00; H02J 2300/00; H05B 45/00
See application file for complete search history.

(56) References Cited

U.S. PATENT DOCUMENTS 6,192,347 B1    2/2001    Graff
7,580,817 B2    8/2009    Bing
(Continued)

OTHER PUBLICATIONS

Higginson, "Easy DIY Solar Lighting," Mother Earth News. May 2007. http://www.motherearthnews.com/diy/easy-diy-solar-lighting-zmaz07amzsel (Year: 2007).*
(Continued)

*Primary Examiner* — Rexford N Barnie
*Assistant Examiner* — Joseph N Inge
(74) *Attorney, Agent, or Firm* — Carr & Ferrell LLP (57) ABSTRACT

Various embodiments of the present invention include systems and methods for generating and conserving power for illuminating a space including obtaining energy producing equipment further including a racking system, a direct current to alternating current inverter, a solar module, a light source and connecting the solar module to the racking system, connecting the direct current to alternating current inverter to the solar module, connecting the light source to the solar module through the direct current to alternating current inverter, receiving from the solar module by the inverter a direct current and converting it to alternating current, and causing by the alternating current the light source to visually illuminate the space.

20 Claims, 11 Drawing Sheets

Related U.S. Application Data continuation-in-part of application No. 13/118,348, filed on May 27, 2011, now abandoned.

(60) Provisional application No. 61/396,559, filed on May 28, 2010.

(51) Int. Cl.
*H02J 3/46* (2006.01)
*H02J 7/35* (2006.01)
*H05B 41/36* (2006.01)

(56) References Cited

U.S. PATENT DOCUMENTS

| | | | |
|---|---|---|---|
| 7,865,416 B1 | 1/2011 | Graff et al. | |
| 8,209,265 B1 | 6/2012 | Agnew et al. | |
| 11,404,880 B2 * | 8/2022 | Pawlik | H02J 3/388 |
| 2002/0165726 A1 | 11/2002 | Grundfest | |
| 2004/0066094 A1 * | 4/2004 | Suzuki | H02J 3/38 |
| | | | 307/18 |
| 2007/0198380 A1 | 8/2007 | Hynek | |
| 2008/0046387 A1 * | 2/2008 | Gopal | H02J 3/008 |
| | | | 705/412 |
| 2008/0195542 A1 | 8/2008 | Al Zarawani | |
| 2008/0195555 A1 | 8/2008 | Carr | |
| 2008/0195563 A1 | 8/2008 | James | |
| 2008/0272934 A1 * | 11/2008 | Wang | H02J 13/00024 |
| | | | 340/870.11 |
| 2008/0306860 A1 | 12/2008 | Musier et al. | |
| 2008/0312945 A1 | 12/2008 | White | |
| 2009/0157545 A1 | 6/2009 | Mobley | |
| 2009/0187509 A1 | 7/2009 | McNamee et al. | |
| 2009/0210269 A1 | 8/2009 | Sade | |
| 2009/0210274 A1 | 8/2009 | McMahon et al. | |
| 2009/0234750 A1 | 9/2009 | Arfin | |
| 2009/0313083 A1 | 12/2009 | Dillon et al. | |
| 2010/0010686 A1 | 1/2010 | Shore et al. | |
| 2010/0010924 A1 | 1/2010 | Ivie et al. | |
| 2010/0042528 A1 | 2/2010 | Youngs et al. | |
| 2010/0042557 A1 | 2/2010 | Block et al. | |
| 2010/0057480 A1 | 3/2010 | Arfin et al. | |
| 2010/0293045 A1 * | 11/2010 | Burns | G06Q 30/0208 |
| | | | 705/34 |
| 2011/0036386 A1 | 2/2011 | Browder | |
| 2011/0295772 A1 | 12/2011 | Pawlik | |
| 2011/0320333 A1 | 12/2011 | Becker et al. | |
| 2012/0031470 A1 * | 2/2012 | Dimov | F24S 25/613 |
| | | | 136/251 |
| 2012/0242148 A1 * | 9/2012 | Galati | H02J 3/28 |
| | | | 307/39 |
| 2018/0351364 A1 | 12/2018 | Pawlik | |

OTHER PUBLICATIONS

Doll (Lex Helius: The Law of Solar Energy, 2nd ed. (Jan. 16, 2010), http://www.stoel.com/webfiles/lawofsolarenergy.pdf, 157 pages.

Hydrogen 2000, Renewable Power (Jul. 15, 2004). www.hydrogen2000.com/rp_guide.pdf, pp. 1-40.

Clark Energy Group, "Renewable Energy," (Oct. 4, 2009). http://www.clarkenergygroup.com/Renewable-Energy.aspx, 1 page.

United States Department of Energy, "PV FAQs," (Feb. 2004). http://www.nrel.gov/docs/fy04osti/35097.pdf, 2 pages.

\* cited by examiner

ADVANCED SYSTEMS AND METHODS FOR GENERATING AND CONSERVING POWER

CROSS REFERENCE TO RELATED APPLICATIONS

The present continuation application claims the priority benefit of U.S. non-provisional patent application Ser. No. 16/030,762 filed on Jul. 9, 2018 titled "System and Methods for Generating and Conserving Power," which in turn is a continuation in part and claims the priority benefit of U.S. non-provisional application Ser. No. 13/118,348 as filed on May 27, 2011 titled "Systems and Methods for Developing and Optimizing Underutilized Real Property," which in turn claims the priority benefit of U.S. provisional application Ser. No. 61/396,559 as filed on May 28, 2010 titled "Method for Developing and Optimizing Underutilized Residential and Commercial Real Estate," the disclosures of all applications incorporated by reference in their entireties.

FIELD OF THE INVENTION

The present invention is directed to systems and methods for generating and distributing power.

SUMMARY OF THE INVENTION

Various embodiments of the present invention include systems and methods for generating and distributing power for illuminating a space including obtaining energy producing equipment further including a racking system, a direct current to alternating current inverter, a solar module, a light source and connecting the solar module to the racking system, connecting the direct current to alternating current inverter to the solar module, connecting the light source to the solar module through the direct current to alternating current inverter, receiving from the solar module by the inverter a direct current and converting it to alternating current, and causing by the alternating current the light source to visually illuminate the space.

Various embodiments also include systems and methods for generating and distributing power comprising connecting a plurality of energy producing equipment to an energy control and storage device, connecting a plurality of energy consuming devices to the energy control and storage device, balancing the energy produced by the energy producing equipment with the energy consumed by the energy consuming devices, saving excess unconsumed energy by the energy storage device, and distributing the excess unconsumed energy to another energy storage device.

DETAILED DESCRIPTION

The present application is directed to various exemplary systems and methods for generating and distributing power.

According to the U.S. EPA's Energy Star program, energy use is the single largest operating expense for commercial buildings and can represent as much as one-third of operating budgets and accounts for nearly 20 percent of the nation's annual greenhouse gas emissions. It is imperative, then, for the real estate owner to take all practical measures to generate and distribute power onsite as well as reduce energy consumption to reduce operating costs.

Figure 1:
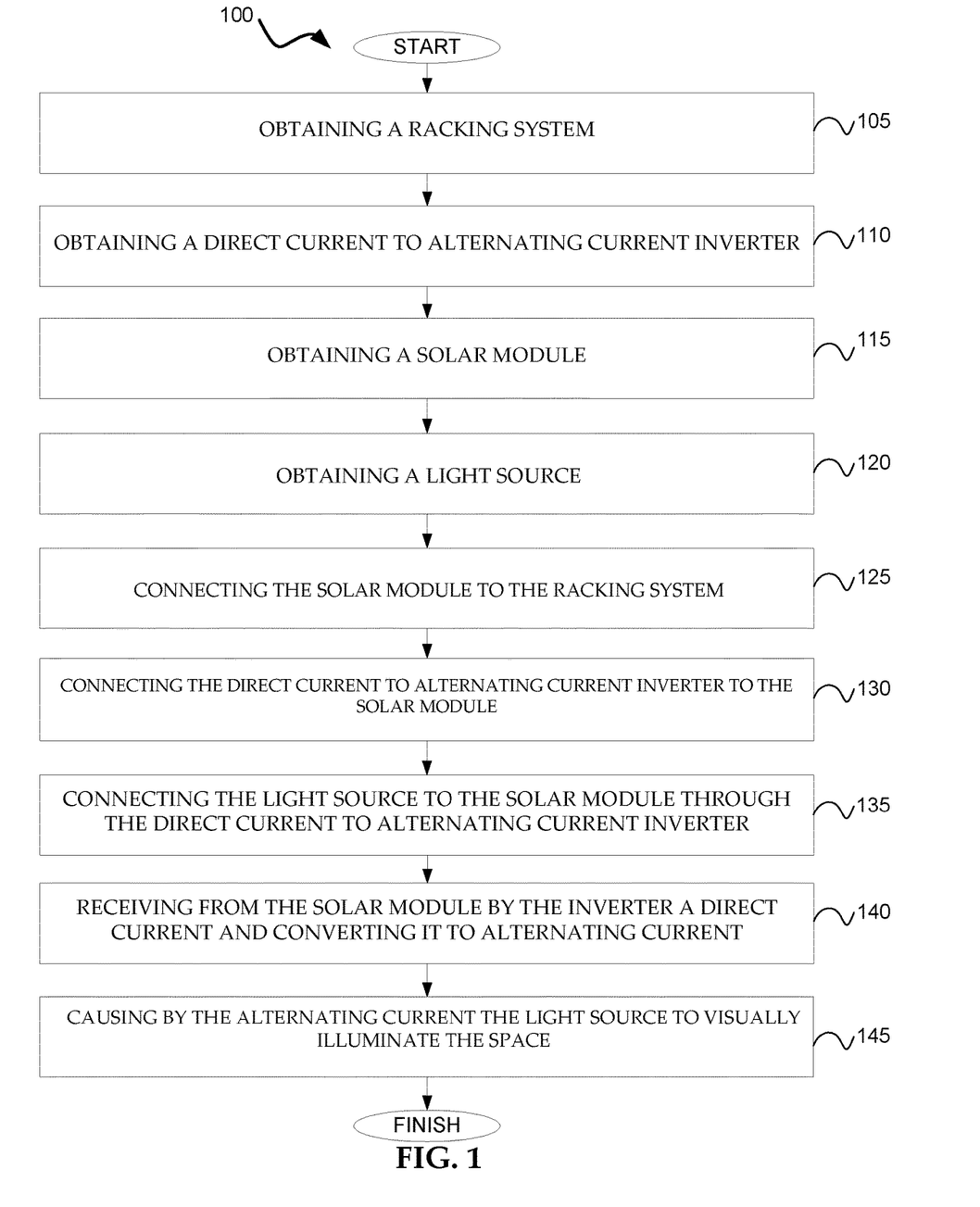
FIG. 1 is a general flowchart 100 of an exemplary method for generating power according to various embodiments of the present invention.

FIG. 1 is a general flowchart of an exemplary method for generating power according to various embodiments of the present invention.

At step 105, a racking system is obtained

At step 110, a direct current to alternating current inverter is obtained.

At step 115, a solar module is obtained.

At step 120, a light source is obtained.

At step 125, the solar module is connected to the racking system.

At step 130, the direct current to alternating current inverter to the solar module are connected.

At step 135, the light source to the solar module through the direct current to alternating current inverter are connected.

At step 140, a direct current is received from the solar module by the inverter and it is converted to an alternating current.

At step 145, the alternating current to the light source to visually illuminates the space.

Figure 2:
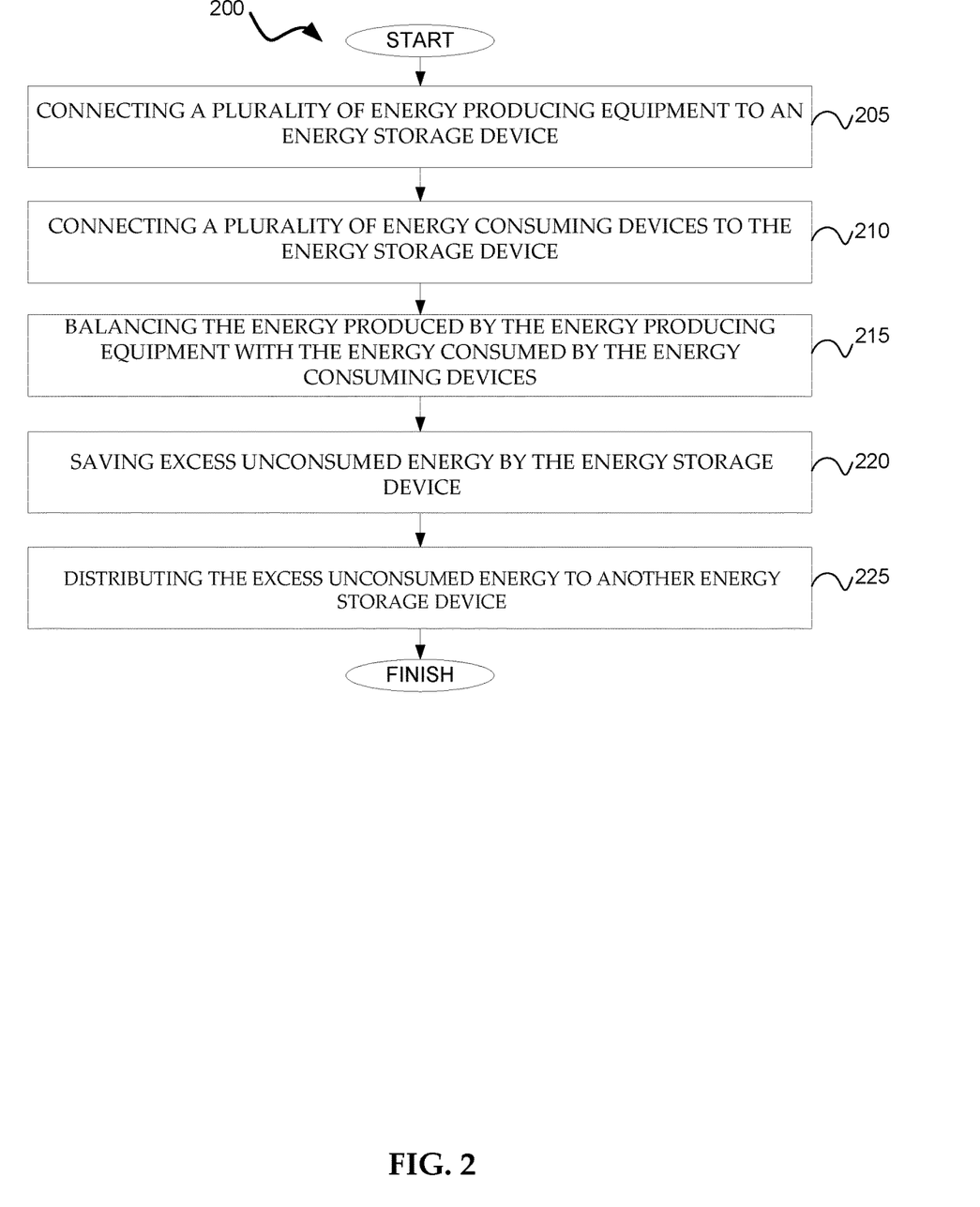
FIG. 2 is a general flowchart 200 of an exemplary method for conserving power according to various embodiments of the present invention.
Figure 3A:
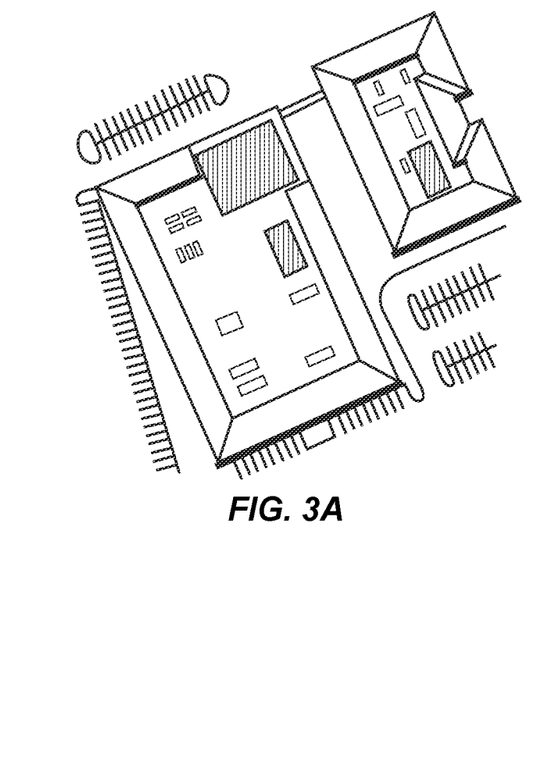
FIGS. 3A and 3B are overhead views of commercial buildings illustrating potential underutilized real property on rooftops according to various embodiments of the present invention.
Figure 3B:
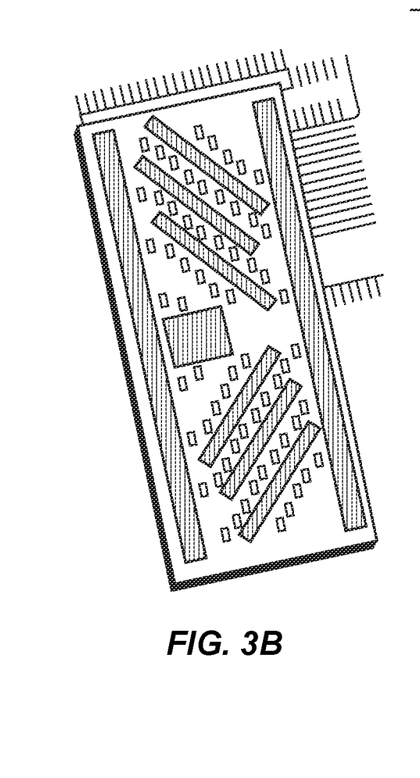
Figure 3C:
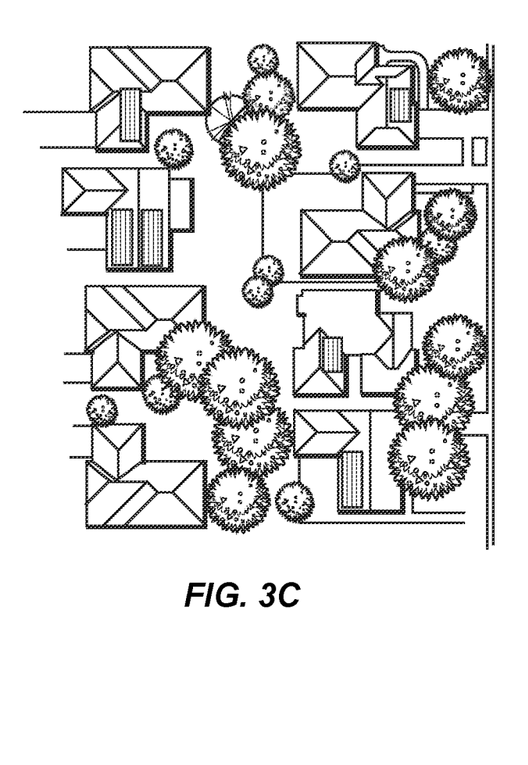
FIG. 3C is an overhead view of residential buildings illustrating potential underutilized real property on rooftops according to various embodiments of the present invention.
Figure 4A:
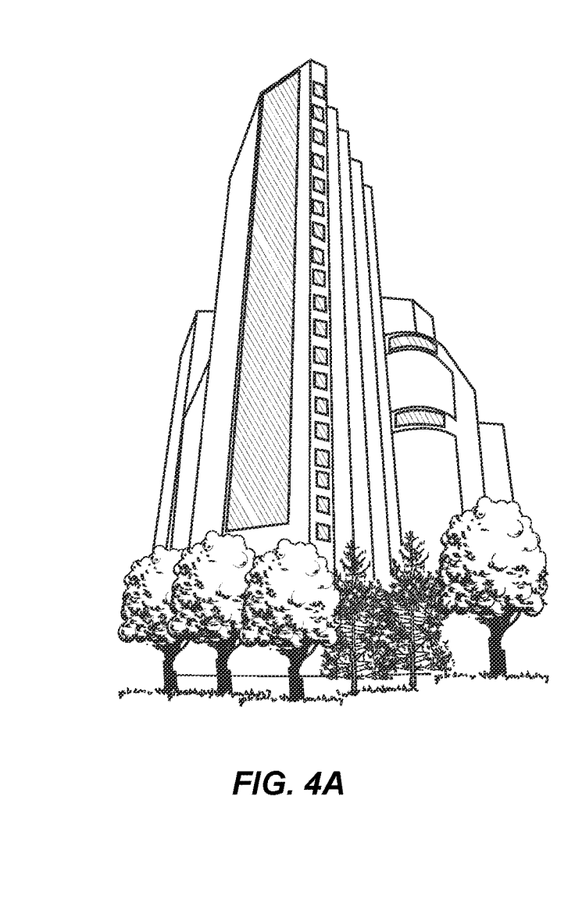
FIGS. 4A-4C are perspective views of commercial buildings illustrating potential underutilized real property on the exterior side surfaces of the buildings according to various embodiments of the present invention.
Figure 4B:
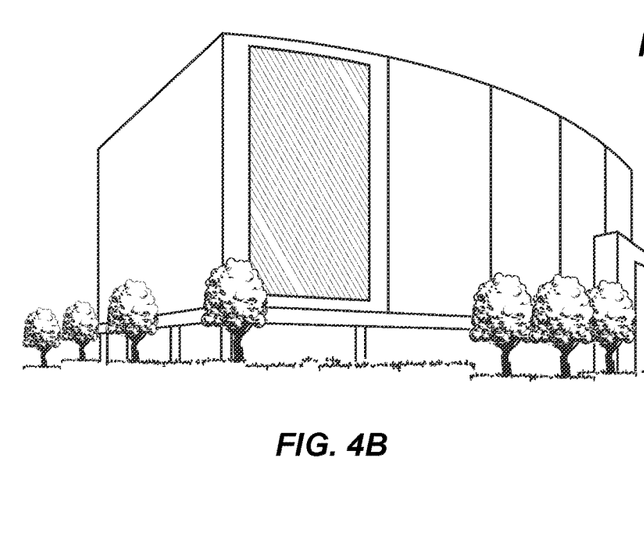
Figure 4C:
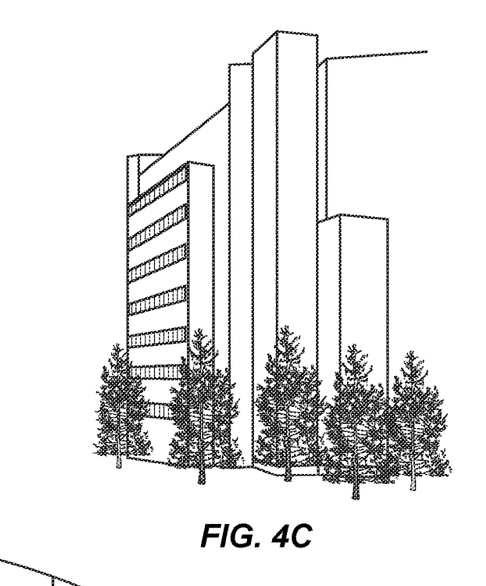

FIG. 2 is a general flowchart of an exemplary method for conserving power according to various embodiments of the present invention.

At step 205, a plurality of energy producing equipment is connected to an energy control and storage device.

At step 210, a plurality of energy consuming devices are connected to the energy control and storage device.

At step 215, the energy produced by the energy producing equipment is balanced against the energy consumed by the energy consuming devices.

At step 220, excess unconsumed energy is saved by the energy storage device.

At step 225, the excess unconsumed energy is distributed to another energy storage device.

FIGS. 3-10 illustrate various examples of potential underutilized real property (depicted by the cross-hatched areas in each figure) for a variety of commercial and residential real property scenarios. FIGS. 3A and 3B illustrate underutilized real property on the exterior roofs of commercial buildings, while FIG. 3C illustrates the same on residential buildings. The areas designated as underutilized real property may exclude existing structures and equipment on the roofs such as air conditioner units, blowers, vents, stacks, chimneys, antennas, wiring, and the like, as well as areas needed to access the structures and equipment. Underutilized real property may not be limited to the tops of buildings. As illustrated in FIGS. 4A-4C, the exterior side surfaces of the buildings may be underutilized real property.

Figure 5A:
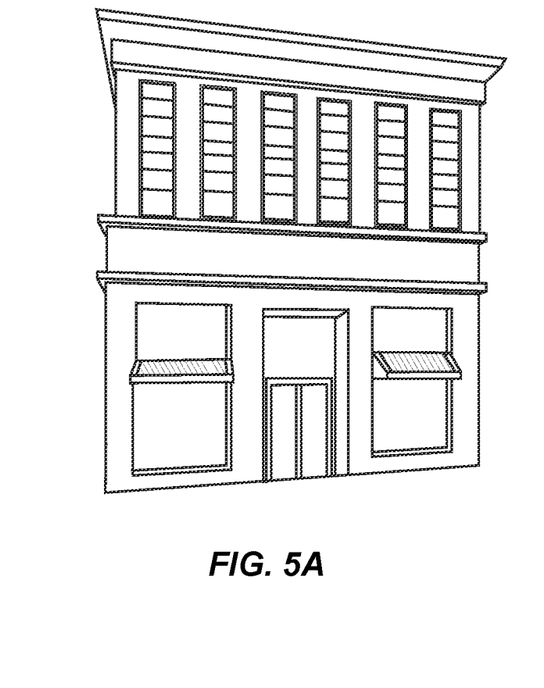
FIGS. 5A-5C are perspective views of commercial buildings illustrating potential underutilized real property on the façade of the buildings according to various embodiments of the present invention.
Figure 5B:
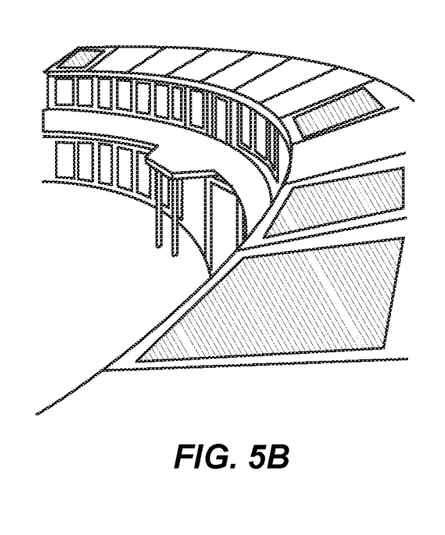
Figure 5C:
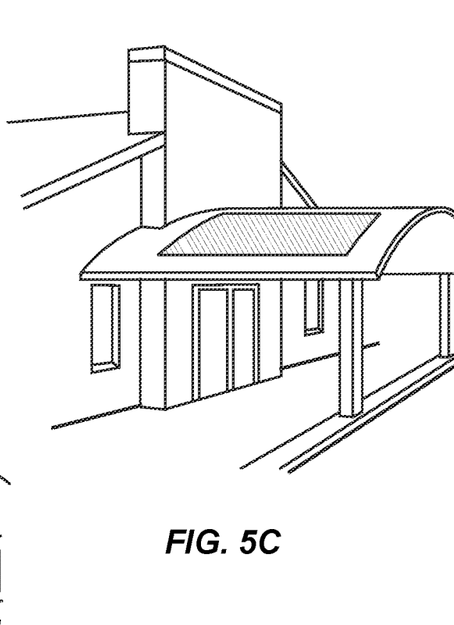
Figure 6A:
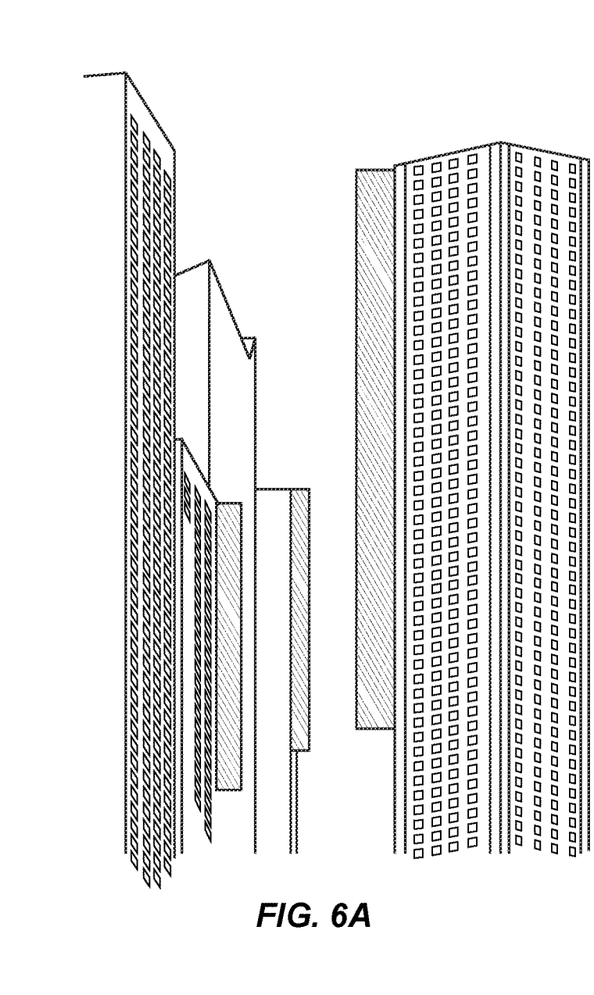
FIGS. 6A-6C are perspective views of commercial buildings illustrating potential underutilized real property appended to the building façade or attached to the buildings according to various embodiments of the present invention.
Figure 6B:
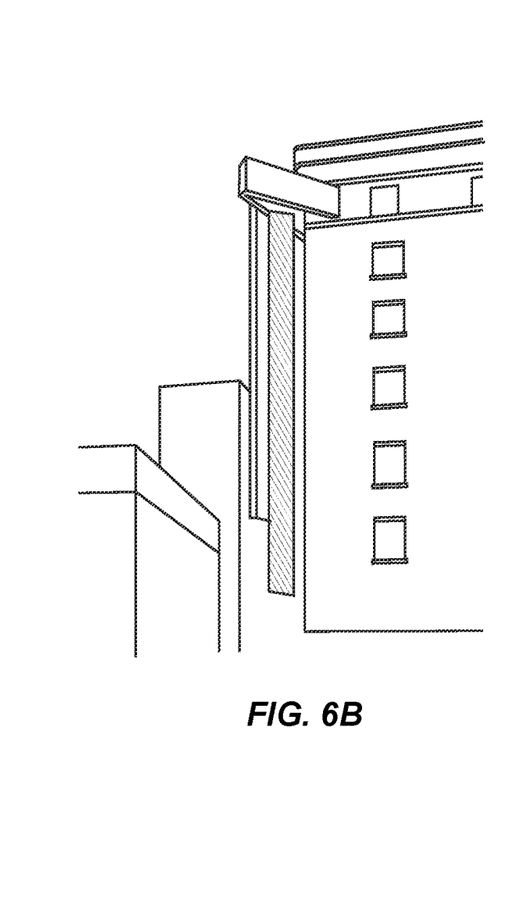
Figure 6C:
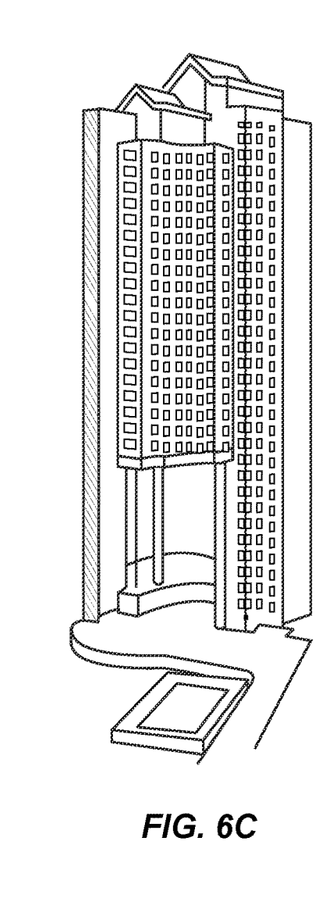

FIGS. 5A-5C show that various surfaces on the façade of buildings such as overhangs and awnings may be underutilized real property. Further, as illustrated in FIGS. 6A-6C, underutilized real property may be appended to the building façade or structures such as signs attached to the building.

Figure 7A:
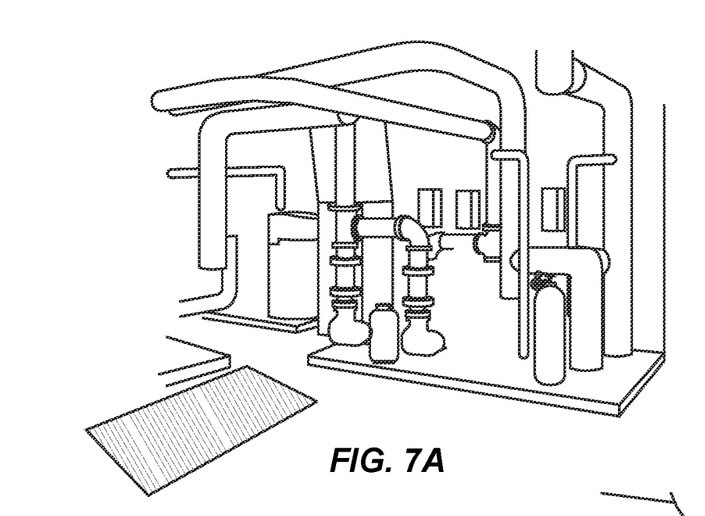
FIGS. 7A-7C are perspective views of interior spaces of commercial buildings illustrating potential underutilized real property within mechanical areas of the buildings according to various embodiments of the present invention.
Figure 7B:
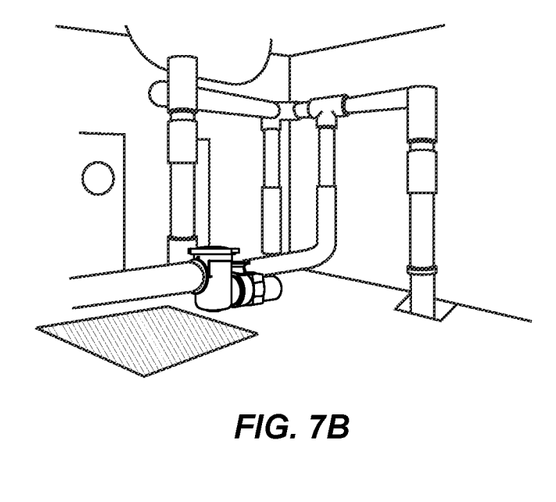
Figure 7C:
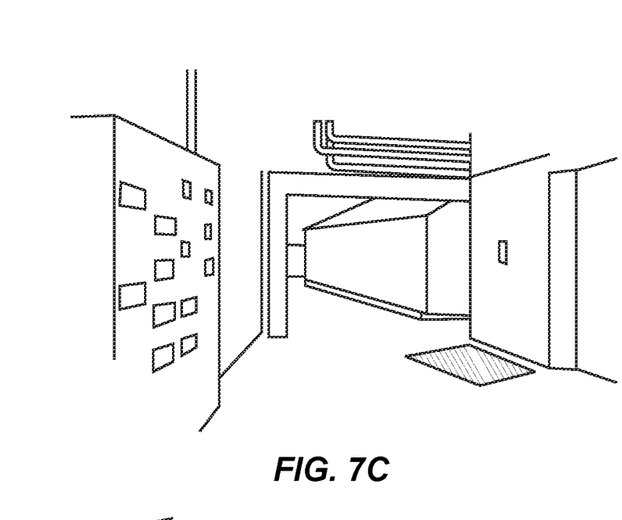
Figure 8A:
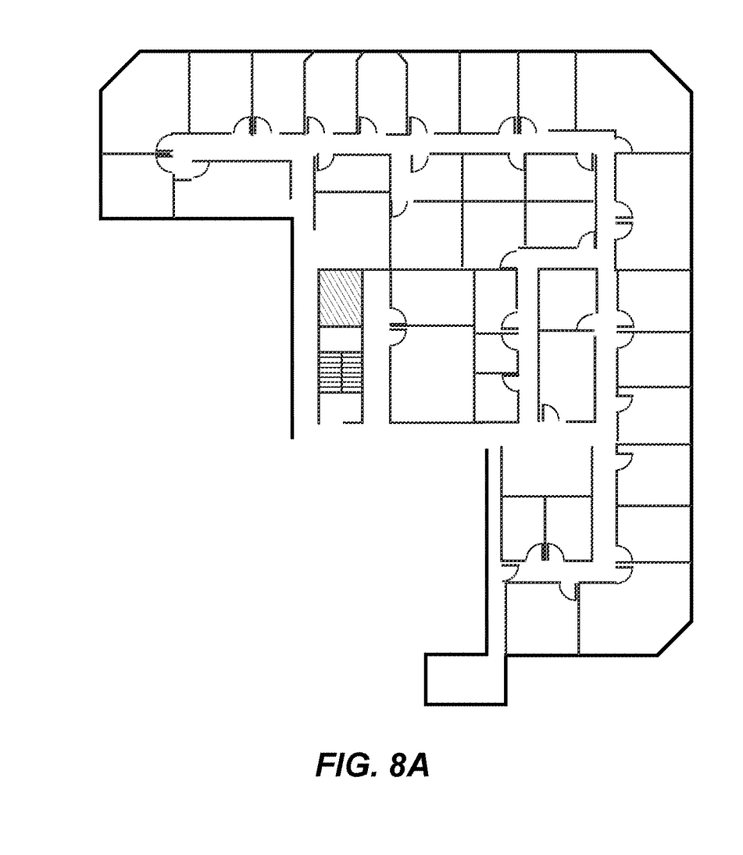
FIGS. 8A and 8B are floor plans of commercial buildings illustrating potential underutilized real property in the building core according to various embodiments of the present invention.
Figure 8B:
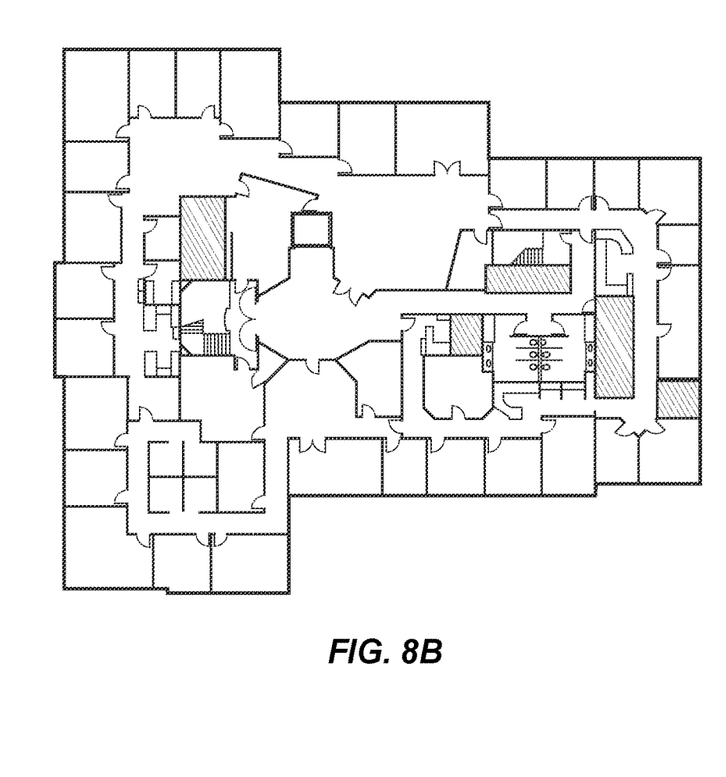

Underutilized real property may also be located on the interior of a building. FIGS. 7A-7C illustrate underutilized real property in mechanical areas of buildings that may be used to house equipment associated with energy generation, monitoring equipment, and control equipment. Other interior spaces may also include underutilized real property, such as the building core as shown in FIGS. 8A and 8B. The building core may include utility shafts, elevator shafts, stairwells, ventilation shafts, and the like.

Figures 9A, 9B:
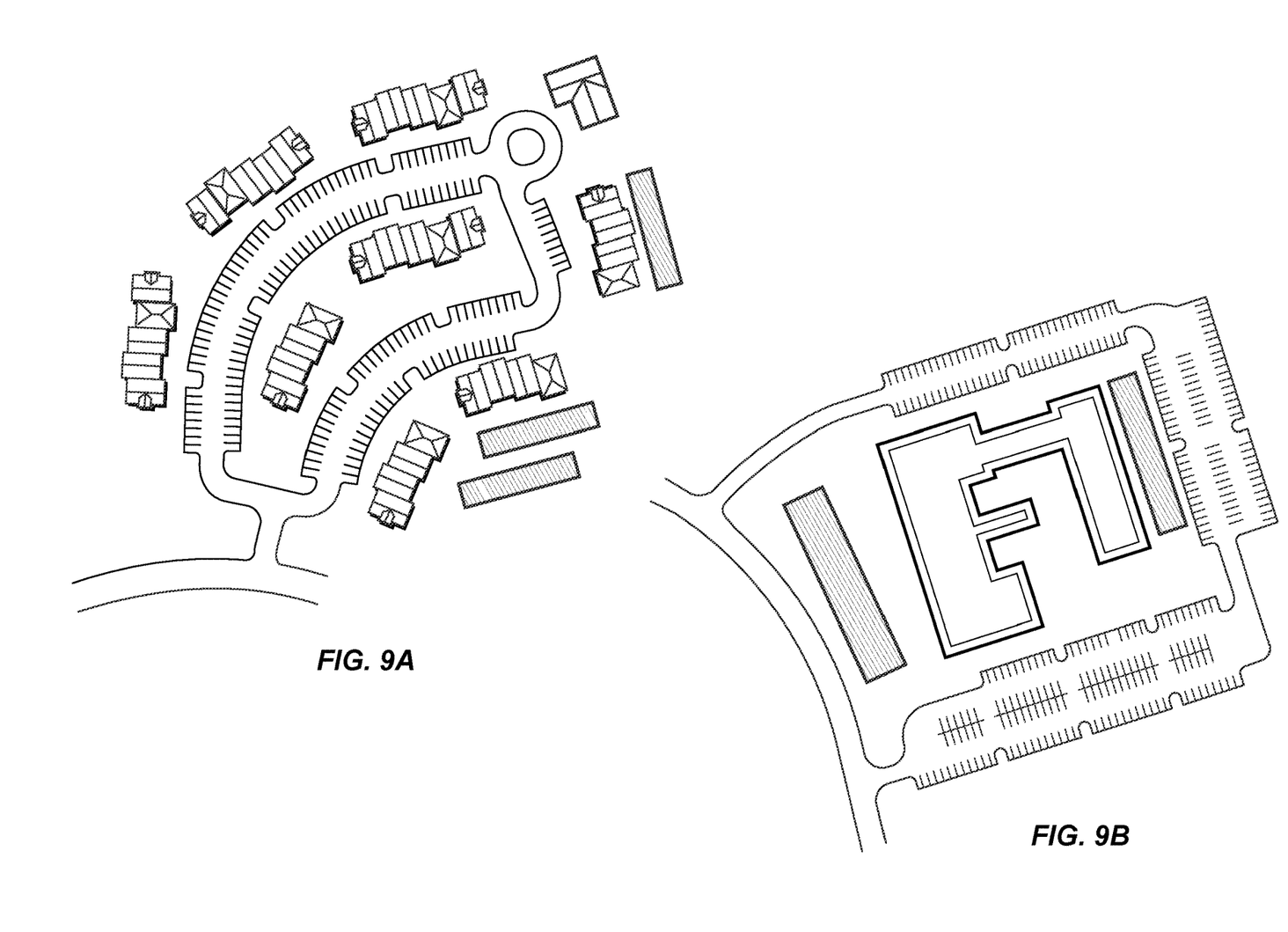
FIGS. 9A and 9B are site plans for commercial properties illustrating potential underutilized real property in open land adjacent to buildings and parking lots according to various embodiments of the present invention.
Figure 10A:
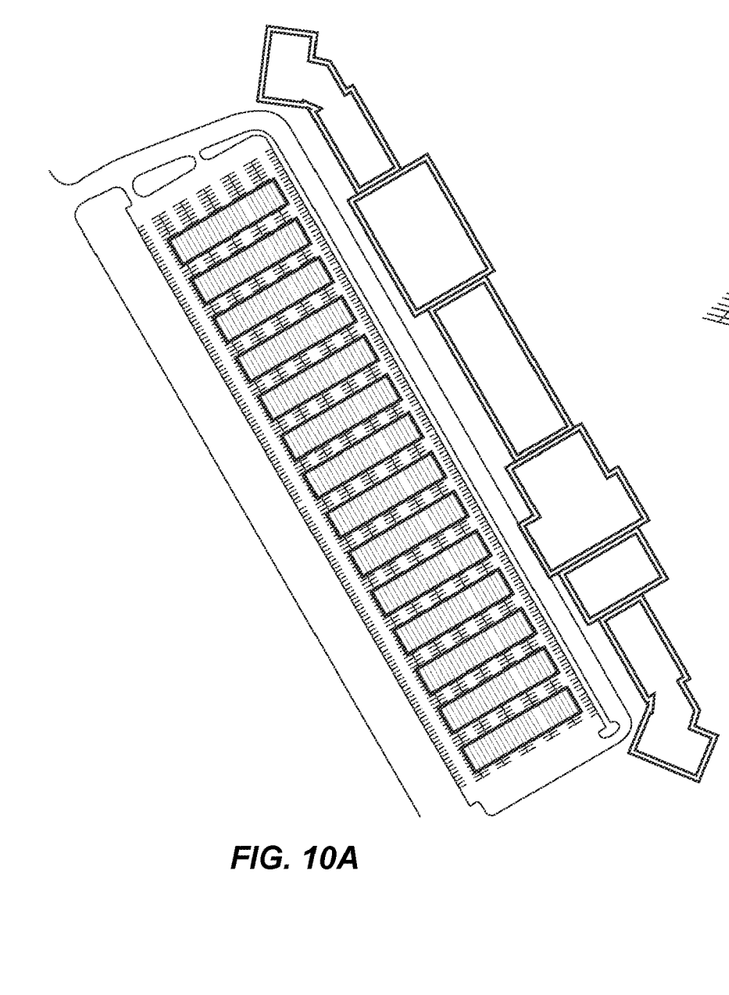
FIGS. 10A and 10B are overhead views of parking lots and parking garages illustrating potential underutilized real property according to various embodiments of the present invention.
Figure 10B:
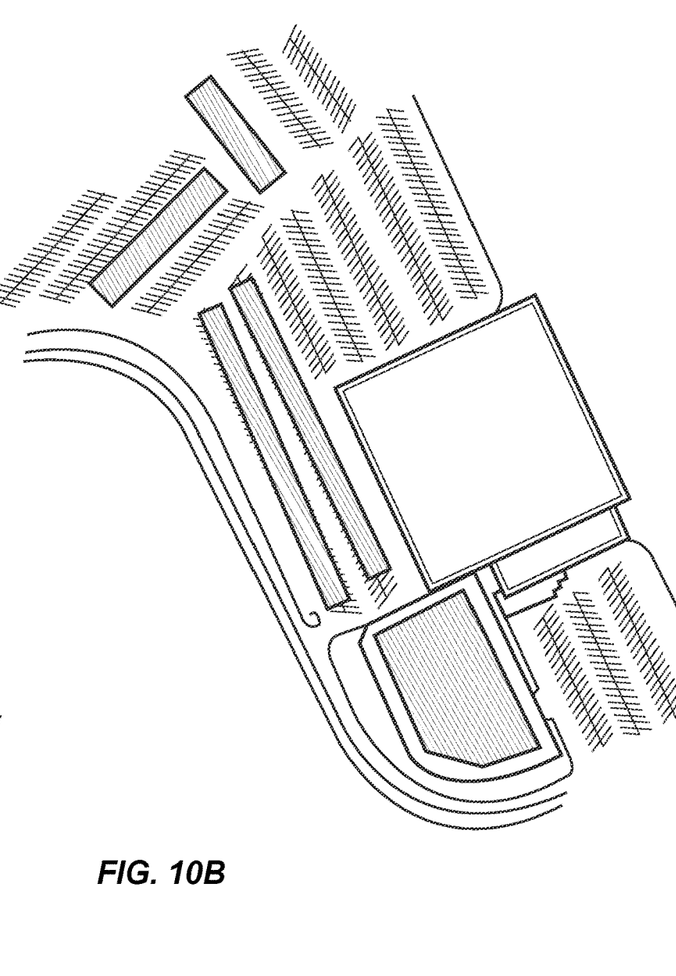

In addition to the areas on and within the building, the grounds surrounding the building may include underutilized real property. FIGS. 9A and 9B illustrate underutilized open land adjacent to buildings and parking lots. Similarly, areas in and around parking lots and garages may be underutilized real property as illustrated in FIGS. 10A and 10B.

Depending on the type of development contemplated for the energy producing property, a variety of issues may be analyzed to determine the feasibility of developing the identified space. For example, a development that includes solar panels may be most interested in the exterior surfaces of buildings and the grounds around the building. Further, southerly or southwesterly exposure with little or no obstruction of sunlight may be desirable. Additional equipment may be required to provide an interface between the solar panels and the existing electrical system within the building. Thus, some amount of underutilized interior space within the building may be required. In order to minimize installation costs, the interior space may preferably be located in proximity to the building's electrical system. Additionally, the solar panels and other equipment may require periodic maintenance and servicing, so the underutilized real property chosen should provide adequate access for personnel to perform these functions.

The real estate owner may also require access to existing building equipment, such as air conditioner units and electrical panels. The selection of underutilized real property should also take into account necessary access to existing building systems, structures, and utilities.

Identification of the underutilized real property may also include an analysis of the energy demands of the real estate and the solar resources available (assuming solar photovoltaic energy generation equipment will be used) at the identified underutilized real property. This type of analysis may be performed, at least in part, in conjunction with step 3, developing the identified underutilized real property into energy producing property. The overall building energy requirements in terms of kilowatt hours/day (kWh/day) may be determined from historical records or, as in the case of new construction, design estimates. The energy generating potential may then be calculated for a given type of equipment based on the solar insolation of the real estate, the surface area of solar panels that can be installed on the underutilized property, and the nominal power output of the solar panels. The energy generating capacity is then compared to the energy requirements of the real estate.

If the energy generating capacity exceeds the energy requirements, then the solar panels may provide the entire energy needs of the building or more. If the energy requirements exceed the generating capacity, then the energy generated may be dedicated to a specific energy load, such as interior lighting.

Other factors may also be considered when identifying the underutilized real property. Zoning requirements may restrict where solar panels or other energy generating equipment may be located. Zoning requirements may exclude some or all of the underutilized land area around the building from consideration. If the real estate includes older buildings, the zoning requirements may require that the older buildings be brought up to current code as part of the project. Such considerations may impact significantly on the financial viability of the project and should be addressed early in the planning stages.

Aesthetic concerns should also be addressed. The real estate owner or the tenants may not want the energy generating equipment to be highly visible, which would restrict which underutilized real property could be used. The owners of neighboring properties may also have aesthetic concerns.

The real estate owner should also be consulted on whether the underutilized real property is targeted for future development that would preclude placement of energy generating equipment. This would include rooftops as well as property surrounding the building. For example, an air conditioner unit or a heating, ventilating, and air conditioning ("HVAC") unit on the roof may be targeted for replacement, and the new units may require a larger footprint or larger access area for installation.

The development plan may take into account a broad range of factors including, but not limited to, building age, current layout of rooftop and interior equipment, solar obstructions, rooftop load capacity, roof membrane age and type, the building's energy management system, and local climatological conditions.

The development plan may focus on how to minimize the effect of the development on the existing structure and building envelope, and to minimize the effect on current tenants. The ongoing maintenance requirements of existing building systems should be taken into account when deciding on placement of equipment and interconnection with existing wiring. Maintenance of the existing roof membrane should also be considered, in particular how roof repairs and replacement may be carried out once the energy producing equipment is installed.

Another aspect of the development step is the proper sizing of the energy producing equipment. This may involve an in-depth analysis of current building energy requirements, including how the energy is used in the building. For example, the air conditioning system or HVAC system may account for a significant amount of the overall energy demand, but electricity for these systems may be supplied as alternating current rated at 220 volts. Depending on the energy producing equipment selected, it may not be feasible to supply electricity at this rating. It may be more efficient to supply loads that draw lower voltage and/or amperage. It may also be more efficient to supply loads that use direct current rather than alternating current. For example, if the energy producing equipment is comprised of solar panels, then direct current is generated. If the electricity from the solar panels is used to power alternating current sources, then the direct current must be converted to alternating current, which may introduce significant inefficiencies. In this example, it may be possible to run the fluorescent lights in the building directly from the current produced by the solar panels Another type of analysis that may be performed in the equipment selection process is determining an amount of energy that may be generated per unit area of space occupied by the energy generating equipment. For example, if 500 square feet of roof space is available for installation of solar panels and the energy load to be supplied is 60,000 kWh, then the energy generating equipment will be required to generate at least about 120 kWh per square foot of installation space. A similar analysis may be performed for a volume of space (cubic feet) occupied by the energy generating equipment, particularly equipment that is installed inside the building.

Excess generated energy may also be stored rather than sold to another user. In this case, the equipment selection process may consider energy storage equipment such as batteries and capacitors. Since energy storage equipment may require a significant amount of physical space, careful planning may be needed to place adequate storage in limited available areas.

System upkeep and maintenance may include keeping solar panels free of obstructions, keeping any combustion equipment operating efficiently including maintaining uninterrupted fuel supplies, and maintaining adequate access to energy generating equipment. A primary purpose of the management function may be to maintain a consistently running system that is transparent to the energy user.

The above description of the present invention includes discussions of energy producing equipment. While solar panels (photovoltaic systems) have been used as a convenient example throughout the discussions, other energy producing systems as are known in the art may also be used. Examples of energy producing equipment other than solar panels include biodiesel combustion, natural gas combustion, fuel cells, windmills, wind turbines, anaerobic digester systems, and nuclear generators. Other energy producing equipment such as coal and petroleum combustion equipment may also be considered for the present invention, although cleaner energy sources may be preferred.

Figure 11:
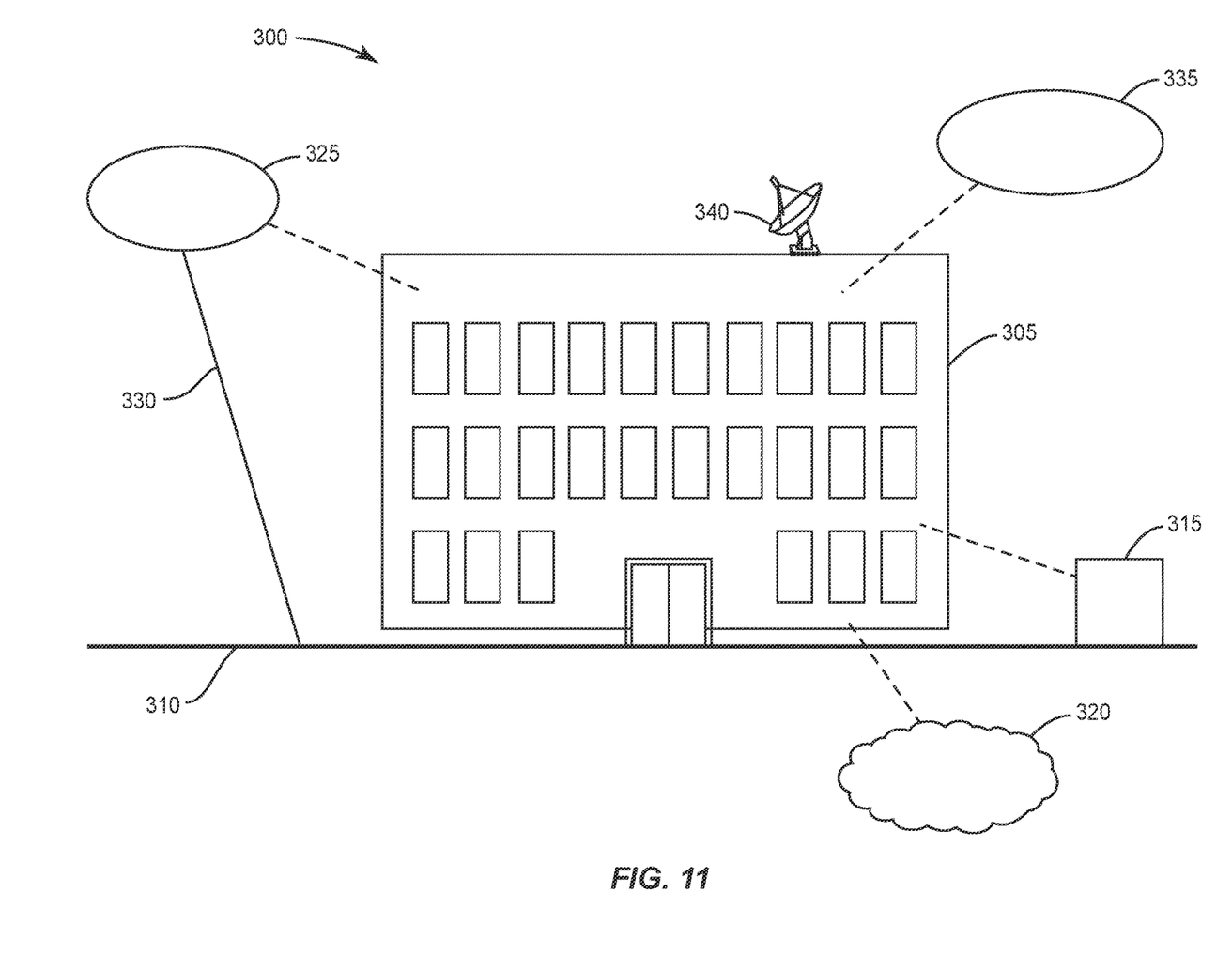
FIG. 11 is a schematic diagram illustrating exemplary energy sources and energy producing equipment according to various embodiments of the present invention.

Additionally, the discussion of the energy producing equipment places the equipment either on the land (e.g., solar panel located on the land surrounding the building), on the improvement (e.g., solar panel located on the building roof), or in the improvement (e.g., fuel cell located within the building). The scope of the present invention includes energy producing equipment wherever located in relation to the land and improvement, or energy sources wherever located in relation to the land and improvements. FIG. 11 illustrates a system 300 comprised of land and improvements and energy producing equipment and energy sources (referred to herein as energy source/equipment). Improvement (building) 305 is located on land 310. In addition to the energy producing equipment discussed previously, other energy sources/equipment 315 may be located apart from land 310, such as a hydroelectric dam located some distance from land 310. An underground energy source/equipment 320, such as a geothermal energy source, may be located below a surface of the land 310 yet provide energy to the improvement 305. Likewise, a suspended energy source/equipment 325 may be positioned in the space above the land 310 (or apart from land 310) and may be held in place by tether 330 or other means of fixing the suspended energy source/equipment. For example, a wind turbine could be suspended high enough in the atmosphere to encounter more continuous winds than may be encountered near the surface of land 310. Solar reflectors could also be suspended above the land 310. Finally, an airborne energy source/equipment 335 may be in the atmosphere, or above the atmosphere, such as a laser in orbit around the earth. The airborne energy source/equipment 335 may utilize wireless transmission of energy which may be received at the land and improvements by a receiver such as satellite antenna 340. The dashed lines in FIG. 11 represent transmission of energy (whether wired, wireless, or other technology) from the energy sources/equipment 315, 320, 325, 335 by any means known in the art or that may become known in the art. The energy sources/equipment 315, 320, 325, 335 comprise energy sources and energy producing equipment known in the art or that may become known in the art.

As used herein, the terms "having", "containing", "including", "comprising", and the like are open ended terms that indicate the presence of stated elements or features, but do not preclude additional elements or features. The articles "a", "an" and "the" are intended to include the plural as well as the singular, unless the context clearly indicates otherwise.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

While the present invention has been described in connection with a series of preferred embodiments, these descriptions are not intended to limit the scope of the invention to the particular forms set forth herein. It will be further understood that the methods of the invention are not necessarily limited to the discrete steps or the order of the steps described. To the contrary, the present descriptions are intended to cover such alternatives, modifications, and equivalents as may be included within the spirit and scope of the invention as defined by the appended claims and otherwise appreciated by one of ordinary skill in the art.

Example

A feasibility study of the methods of the present invention was completed for the Summit State Bank building in Santa Rosa, Calif. The building is located at 500 Bicentennial Way near Highway 101. The building was constructed in 2002 and houses a number of tenants.

Santa Rosa has cool, wet winters and warm, mostly dry summers. In the summer, nights are usually foggy but the fog generally clears to sunny weather in the late morning to midday. The average annual rainfall is 30.45 inches, with 265 days of sunny weather. The daily temperature ranges from an average low of 44.7° F. to an average high of 71.7° F.

The average solar insolation over a full year is 4.48 kWhr/day. Over the course of the year, the monthly insolation peaks in the summer months and gradually decreases through the winter months, reaching its lowest point in the December-January timeframe. The insolation information was used to determine the generation potential of all solar power options investigated.

An analysis of the electricity demand of the Summit State Bank building was performed to ensure that there was sufficient demand within the building for electricity generated by a rooftop solar panel installation. Information gathered during a site visit to the bank building, coupled with information collected from the building's main electricity provider, Pacific Gas and Electric (PG&E), provided the basis for the demand analysis.

The building is comprised of three stories of office space. The main energy consuming units in the building are indoor and outdoor lighting, office equipment (photocopiers, computers, and telephones), and the air conditioning system.

The electricity usage of the building is tracked by a total of six meters. PG&E provided the electricity and billing information from March 2010 to February 2011. This information was analyzed in detail to generate an annual electricity consumption model for the building.

The annual electricity consumption for the building was plotted and tabulated. The electricity consumption of the building was categorized into "on peak," "partial peak," and "off peak" corresponding to the time at which the electricity was consumed. Each category was billed at a different rate.

The building consumed about 593,000 kWhr annually at a total cost of $100,000, bringing the average cost of electricity per kWhr to $0.169. The electricity charge varies seasonally. Total electricity charges for the months of May to October are about 30 percent more expensive than the other months primarily due to increased consumption of "on peak" electricity which is billed at a higher rate.

The Summit State Bank building has ample rooftop space available for a solar installation. The overall footprint of the rooftop measures 88 feet×120 feet. In the center of the rooftop, however, is an elliptical enclosure that houses the building's HVAC system components. The remaining area is available for solar panels. In calculating the total amount of area available for solar panels, it was prudent to leave space adjacent to the walls of the roof open to avoid shading. The resulting area available for the solar installation was estimated to be 394 square meters.

The photovoltaic (PV) system included a number of components in addition to the solar panel modules themselves. The following paragraphs discuss the racking system for mounting the panels, the power management system for directing the generated electricity, and the wiring for delivering the electricity.

First, a racking and mounting system was necessary to keep the modules in place during normal operation and in times of inclement weather. Unfortunately, the weatherproofing on the rooftop of the Summit State Bank building precluded the ability to drill holes into the roof because holes would compromise the seals on the roof. Consequently, a mounting system was used consisting of a weighted ballast that will keep the system grounded regardless of the wind speed.

Several different racking systems are described below. All of the racking systems described have both flush mount and tilt mount options. In flush mounting, the solar panels are mounted parallel to the roof, creating a visually aesthetic appearance. In tilt mounting, the solar panels are mounted at the optimal angle to maximize solar power generation, which is usually adjusted seasonally.

Unirac SolarMount™

The Unirac racking system consisted of a rail set and clip set matched to the type and quantity of panels to mount the panels flush with a roof. The racking system is available in three options: SolarMount Light, Standard, and Heavy Duty. The pricing may reach a minimum of $0.10/W.

Silverback Solar™

The Silverback Solar racking system created a structural mounting that attached directly to the roof framing, thus enabling solar panel mounting without jeopardizing the roof lifespan or integrity.

ProSolar RoofTrac™

The ProSolar racking system was an aluminum and stainless steel racking system that was priced as low as $0.10/W. The racking system was tested to withstand winds up to 125 mph to ensure safety and quality. The racking system attached to the roof via the ProSolar TileTrac™ system, which screwed into the roof tiles.

AEE Solar SnapNrack™

The AEE system was a new line of solar racking system from AEE Solar specifically designed to reduce installation time, thus reducing installation labor costs. The entire design utilized the same size bolts and is compatible with the majority of commercial PV modules. The price of the mount system was approximately $0.25/W.

The Nextek Power Management system was investigated for its potential to increase the efficiency of utilization of the solar power generated by the recommended PV solution. Typical solar energy installations utilize an inverter to convert the DC current generated by the solar panels to an AC current for compatibility with the electricity delivered by the grid. Unfortunately, about 20 percent of the energy is lost when converting from DC to AC in a typical inverter. Some of the AC current is then typically converted back to DC for powering lighting ballasts.

The Nextek system replaced the DC to AC power inverter necessary for most solar installation with a DC network capable of directly powering the DC lighting loads as well as other DC loads. It was shown by the System Advisor Model (SAM) analysis that the inverter represents a significant source of efficiency reductions for the system, so the Nextek system could increase the annual energy delivered by the system with minimal increases in cost. In fact, the installation costs of the Nextek system were reported to be about the same as the inverter cost on a per Watt basis.

When the solar panels were not generating electricity, the Nextek system converted AC power from the grid to the lighting load so that the load was always served. The primary advantage of the Nextek system was the 10 to 40 percent efficiency gains that were realized from eliminating the need to convert the solar power from DC to AC, and then back to DC again.

An analysis was conducted in estimating the percentage of the total Summit State Bank building electricity load to determine the approximate sizing of a solar installation that would be necessary for its generation to meet the peak lighting load. A survey of the total number of circuit breakers that served the lighting demand was taken, and the total amperage capacity of these circuit breakers was divided by the total amperage capacity of all circuit breakers. It was estimated that approximately 20 percent of the total building electricity load was used for lighting. This load accounted for approximately 120 percent of the total generation capacity of the building's rooftop real estate for solar. As such, the Nextek system utilized the solar electricity generated for the lighting load exclusively in taking advantage of a 10-40 percent efficiency gain associated with avoiding DC to AC conversion. A risk was introduced, however, if one of the tenants moves out while the solar system is still in use. In this scenario, the lighting load could drop below the generation potential, and the DC electricity could not be utilized.

There were two options for wiring, depending on the intended use of the solar-generated electricity. If the Nextek system was to be used so that the solar-generated electricity was used for lighting, the system should be wired to the Nextek transformer, followed by the lighting control box and switches for individual lighting systems. If the power was be used in applications involving AC electricity, then an inverter will be required to convert the direct current power to AC before connecting to the transformer. Specific wiring considerations, such as type and dimension of wires, parallel versus series connections, and the like were determined by manufacturers and contractors.

The following solar module options were considered:
REC Solar—Model AE205-US
REC Solar—Model AE210-US
REC Solar—Model AE215-US
REC Solar—Model AE220-US
Sharp—Model NC 224UC1
Sharp—Model NU-235F1
Sharp—Model 170W NE170UC1
Sanyo—Model HIT-N220A01
Sanyo—Model HIT-N210A01
Suntech—Model STP260-24/Vb-1
Suntech—Model STP270-24/Vb-1
Suntech—Model STP280-24/Vb-1
Canadian Solar—Model CS6X-295M
Canadian Solar—Model CS6P-235P
Canadian Solar—Model CS6P-230P The Canadian Solar module, Model Number CS6X-295M was used. This module has the following specifications:

| Cell Type | Nominal Power (W) | Module Efficiency | Area (m$^2$) | $V_{mp}$ | $I_{mp}$ | $V_{oc}$ | $I_{sc}$ | Temperature Coefficient for P$_{max}$ |
|---|---|---|---|---|---|---|---|---|
| Mono-crystalline | 295 | 15.4% | 1.92 | 36.4 | 8.11 | 44.9 | 8.63 | −0.45%/° C. |

The resulting deliverable output of the system is thus expected to be approximately 80,000 kWhr/year of AC power. This figure includes de-rating of the efficiency of the solar panels over their 25 year lifetime and estimated efficiency reductions associated with wiring and the inverter. It is clear from this analysis that the inverter imparts a significant reduction in system efficiency, motivating the use of the DC power generated at the source made possible by the Nextek system.

Since the customers agreed to purchase a certain amount of power, the business model necessitates a backup system to deliver electricity when the solar panels cannot. It was therefore prudent to consider alternative generation systems that will deliver the guaranteed power regardless of the solar resource availability. A fuel cell is one potential technology that could supplement the solar power on cloudy days. The Bloom Energy power serve fuel cell technology (Model ES-5000) was considered for this purpose because its size is well-suited to be able to supplement the peak power that can be generated from the solar resource available on the Summit State Bank rooftop. The ES-5000 module can provide 100 kW maximum, which compares fairly well with the peak solar power that was generated (60 kW). Due to the untenable increase in cost associated with implementing redundancy for cloudy conditions, it was deemed more reasonable to supplement the solar power generated with grid power at this time for the Summit State Bank building.

The peak generation potential of the Canadian Solar module selected with the real estate available was 60.7 kW. Using the insolation data for Santa Rosa, the resulting average solar insolation was 4.48 kWhr/day. The high efficiency of the solar panel specified resulted in a total yearly generation potential of 219 kWhr-AC/day or 80,000 kWhr-AC/year.

Future analyses including the fact that more electricity will be generated during peak pricing rate times could improve calculated returns.

It was also instructive to investigate the effect of varying the pricing discount at which electricity is sold to the consumer as compared to the PG&E rate. The electricity price was assumed to be between 5 and 10 percent lower than the average price that PG&E charged the building ($0.169/kWh). Thus, the rate charged the customers was between a high of $0.161/kWh and a low of $0.152/kWh.

The invention claimed is:
1. A method for generating and conserving power for a space:
  obtaining energy producing equipment including:
    a racking system on underutilized real property;
    a direct current to alternating current inverter on the underutilized real property;
    a solar module or other distributed energy generation or management equipment on the underutilized real property;
    a device;
  connecting the solar module to the racking system;
  connecting the direct current to alternating current inverter to the solar module;
  connecting the energy producing equipment to an on-site energy system, including an on-site power management system and a power meter owned by a utility company;
  receiving from the solar module or other distributed energy generation or management equipment on the underutilized real property by the inverter a direct current and converting it to alternating current;
  causing by the alternating current the device to use electricity;
  transmitting by the on-site power management system excess alternating current not needed by the device to a grid;
  transmitting by the on-site power management system from the grid the excess alternating current to the device when the solar module is not generating a direct current; and generating an efficiency gain realized from eliminating a need to transmit and distribute the energy generated on-site through the grid.

2. The method of claim 1, wherein the energy producing equipment comprises an energy storage device or a fuel cell.

3. The method of claim 1, further comprising receiving electricity generated by biodiesel combustion.

4. The method of claim 1, further comprising receiving electricity generated by natural gas combustion.

5. The method of claim 1, further comprising receiving electricity generated by a windmill.

6. The method of claim 1, further comprising receiving electricity generated by a wind turbine.

7. The method of claim 1, further comprising receiving electricity generated by an anaerobic digester system.

8. The method claim 1, further comprising causing by the direct current a fluorescent bulb to visually illuminate the space instead of the alternating current.

9. The method of claim 1, further comprising connecting a plurality of other devices that consume electricity to an energy control and storage device.

10. The method of claim 1, further comprising connecting a plurality of other energy producing equipment that generate electricity to an energy control and storage device.

11. The method of claim 1, the device comprising a light source further comprising a fluorescent light bulb or an LED light bulb.

12. The method of claim 1, wherein the underutilized real property is a rooftop of a commercial building.

13. The method of claim 1, wherein the underutilized real property is an exterior side surface of a commercial building.

14. The method of claim 1, wherein the underutilized real property is a façade of a commercial building.

15. The method of claim 1, wherein the underutilized real property is on an easement.

16. A method for conserving power comprising:
connecting a plurality of energy producing equipment to an on-site power management system and a power meter owned by a utility company to an energy control and storage device on underutilized real property;
connecting a plurality of energy consuming devices to the energy control and storage device on the underutilized real property;
balancing energy including alternating current produced by the energy producing equipment with the energy consumed by the plurality of energy consuming devices;
transmitting by the on-site power management system excess alternating current not needed by the plurality of energy consuming devices to a grid;
transmitting by the on-site power management system from the grid the excess alternating current to the energy consuming devices when the energy producing equipment is not generating a direct current; and
generating an efficiency gain realized from eliminating a need to transmit and distribute the energy generated on-site through the grid.

17. The method of claim 16, wherein the underutilized real property is a core of a commercial building.

18. The method of claim 16, wherein the underutilized real property is open land adjacent to a commercial building.

19. The method of claim 16, wherein the underutilized real property is a parking lot of a commercial building.

20. The method of claim 16, wherein the underutilized real property is on an easement.

* * * * *